US 8,504,370 B2

(12) United States Patent
Hong et al.

(10) Patent No.: US 8,504,370 B2
(45) Date of Patent: Aug. 6, 2013

(54) USER-INITIATIVE VOICE SERVICE SYSTEM AND METHOD

(75) Inventors: Kwang Seok Hong, Kwacheon Si (KR); Hyeong Joon Kwon, Seongnam Si (KR)

(73) Assignee: Sungkyunkwan University Foundation for Corporate Collaboration, Suwon-Si, Gyeonggi-do (KR)

( * ) Notice: Subject to any disclaimer, the term of this patent is extended or adjusted under 35 U.S.C. 154(b) by 1657 days.

(21) Appl. No.: 11/676,137

(22) Filed: Feb. 16, 2007

(65) Prior Publication Data

US 2008/0097760 A1   Apr. 24, 2008

(30) Foreign Application Priority Data

Oct. 23, 2006   (KR) .......................... 10-2006-0102727

(51) Int. Cl.
*G10L 15/08* (2006.01)
*G10L 15/22* (2006.01)

(52) U.S. Cl.
USPC ........ 704/270; 704/200; 704/231; 704/270.1; 704/275

(58) Field of Classification Search
USPC ...................................... 704/270, 270.1, 275
See application file for complete search history.

(56) References Cited

U.S. PATENT DOCUMENTS

| | | | | |
|---|---|---|---|---|
| 6,157,905 A * | 12/2000 | Powell | .............................. | 704/2 |
| 6,269,336 B1 * | 7/2001 | Ladd et al. | ..................... | 704/270 |
| 6,324,513 B1 * | 11/2001 | Nagai et al. | ................... | 704/275 |
| 6,615,172 B1 * | 9/2003 | Bennett et al. | ................. | 704/257 |
| 6,804,330 B1 * | 10/2004 | Jones et al. | ................. | 379/88.01 |
| 6,901,364 B2 * | 5/2005 | Nguyen et al. | ................ | 704/235 |
| 6,999,930 B1 * | 2/2006 | Roberts et al. | ............. | 704/270.1 |
| 7,127,403 B1 * | 10/2006 | Saylor et al. | .................. | 704/275 |
| 7,725,320 B2 * | 5/2010 | Bennett | ........................ | 704/255 |
| 2003/0028367 A1 * | 2/2003 | Chalabi | ........................... | 704/4 |
| 2003/0171926 A1 * | 9/2003 | Suresh et al. | ............. | 704/270.1 |
| 2004/0030689 A1 * | 2/2004 | Anderson et al. | ................ | 707/3 |
| 2004/0098253 A1 * | 5/2004 | Balentine et al. | ............ | 704/215 |
| 2005/0033582 A1 * | 2/2005 | Gadd et al. | .................... | 704/277 |
| 2005/0234727 A1 * | 10/2005 | Chiu | ........................ | 704/270.1 |
| 2007/0198267 A1 * | 8/2007 | Jones et al. | ................... | 704/257 |

FOREIGN PATENT DOCUMENTS

| | | |
|---|---|---|
| KR | 1020030037514 A | 5/2003 |
| KR | 1020050089420 A | 9/2005 |
| WO | WO 2004/023455 A2 | 3/2004 |

OTHER PUBLICATIONS

Reddy, Hemambaradara, et al. "Listener-Controlled Dynamic Navigation of VoiceXML Documents," pp. 346-354, ICCHP 2004, LNCS 3118, Springer-Verlag Berlin Heidelberg.

* cited by examiner

*Primary Examiner* — Jialong He
(74) *Attorney, Agent, or Firm* — Blakely, Sokoloff, Taylor & Zafman LLP

(57) ABSTRACT

A voice service system which includes a database storing information and is connected with a plurality of terminals by a communication network, comprising a call connection unit for transmitting-receiving a signal, on a voice service to/from each of the terminals, a voice processing unit for interpreting a voice instruction received from the terminal and converting an internally-created voice service document into a voice message, a recognition management unit for extracting a grammar, which is expected to be spoken by a user, from the database, a document management unit for creating the voice service document including the extracted grammar as a voice anchor, and a control unit for controlling information related to the voice anchor matching with the voice instruction to be provided.

6 Claims, 8 Drawing Sheets

| IDENTIFIER | KEYWORD | CONTENT | COUNTER | ETC |
|---|---|---|---|---|
| 1 | KEYWORD 1 | CONTENT 1 | COUNTER 1 | ETC 1 |
| 2 | KEYWORD 2 | CONTENT 2 | COUNTER 2 | ETC 2 |
| ... | ... | ... | ... | ... |
| (OMISSION) | (OMISSION) | (OMISSION) | (OMISSION) | (OMISSION) |

Figure 6

USER-INITIATIVE VOICE SERVICE SYSTEM AND METHOD

CROSS-REFERENCE TO RELATED APPLICATION

The present application claims, under 35 U.S.C. 0119(a), the benefit, of the filing date of Korean Patent Application No. 10-2006-0102727 filed on Oct. 23, 2006, the entire contents of which are hereby incorporated by reference.

BACKGROUND OF THE INVENTION

1. Field of the Invention

The present invention relates to a user-initiative voice service system and method, and more particularly, to a method of designing and providing a voice service system which allows a user to control and create a scenario.

More particularly, the invention relates to a user-initiative voice service system and method in which a data structure composed of voice anchors and voice nodes is applied to voice services to support the user so that the user can freely search desired information and resources with any fixed scenarios. Accordingly, the system and method of the invention can provide a user-initiative service which can hardly be provided by either a system-initiative service for providing a service according to one scenario or a mutual-initiative service for providing a slight divergence to a scenario.

2. Description of the Prior Art

In general, voice service refers to service in which a service provider affords a user with resources through the conversation between a user and a voice service system by using voice recognition and voice synthesis technology. In this case, the user's voice is sent through a wire/wireless terminal. In the case of designing voice services, systems are designed by preliminarily surveying user behaviors and composing scenarios based on the surveys. That is, it plans service scenarios as follows: What menus are to be presented to the user? In a case where the user selects a specific menu, what kind of sub-menu or information is to be presented to the user in the next step? Conventional service scenarios are generally two types of scenarios such as system-initiative and mutual-initiative scenarios.

First, the system-initiative scenario is used to acquire user intention and information, and is composed of questions made by the system and replies made by the user in response to the questions. Then, the mutual-initiative scenario generates divergences according to the reply of the user in response to the system's questions in order to provide a service according to user taste, in which questions and replies are repeated in respective divergences. The two types of scenarios have a common feature in that their beginnings and ends are predetermined. There is also a drawback in that, according to new divergence related with a service provided to the user, the scenario should run from the beginning again so that the user can access new information. Accordingly, the system-initiative scenario is mainly used to provide only one service as in a reservation system, whereas the mutual-initiative scenario is mainly used to provide several services at the same time as in a living information service system.

An example of the system-initiative scenario technology is disclosed by Korean Patent No. 0620450, entitled "SYSTEM AND METHOD FOR UNMANNED RESERVATION AND OPERATION OF INDOOR GOLF RANGE BY USING WIRE/WIRELESS COMMUNICATION NETWORK," issued on Aug. 29, 2006.

The technology disclosed in Korean Patent No. 0620450 relates to a system and method for operating unmanned reservation of an indoor golf range by using a wire/wireless network, enabling all operations of the indoor golf range from reservation to shot box allocation. The system includes an ARS system bi-directional communicating with telephones, a server system for acknowledging reservation information, a management control unit for approving the reservation information acknowledged by the ARS system and the server system and informing the user of his/her reservation status, a reservation DV storing reservation information, a card reader for reading the reservation card of the user, displaying the reservation status to the user and a printer for printing the reservation status. That is, according to the technology disclosed in Korean Patent No. 0620450, the user can make a desired date and time zone reservation in the indoor golf range by using the Internet or a telephone. The reservations are automatically arranged and unoccupied shot boxes are automatically notified to the user. This eliminates the need for a manager. This can also reduce economical burden since maintenance fees are rarely needed.

Another example of the system-initiative scenario technology is disclosed by Korean Patent Application Publication No. 2003-0037514, entitled "SYSTEM AND METHOD OPERATING LIVING INFORMATION BASED ON VOICE WEB," published on May 14, 2003.

The technology disclosed in Korean Patent Application Publication No. 2003-0037514 relates to a system arid method operating living information based on a voice web capable of easily searching for living information by telephone and then directly connecting a telephone call to a corresponding part of the living information, thereby optimizing user convenience. The system includes a voice web operating server, which is equipped with a voice web (VEB) engine, a charging engine, a receiving engine, an internal interface, a service DB and other additional network equipment, and connected to a wire/wireless public telephone network to output database information, processed by voice template type voice recognition/synthesizing technology, into voice; a database conversion module for converting a text data into a voice template type data, an SMS server for providing a short message service and a voice web editing tool installed in a respective local terminal. According to the technology disclosed in Korean Patent Application Publication No. 2003-0037514, such information and advertisement with a number of items and necessary for frequent upgrade can be accessed by telephone. In a case where the user wants to conceal the telephone number, it is possible to provide a fake telephone number. This as a result can prevent any crimes by using the telephone number while optimizing convenience.

According to the living information operating system and method disclosed in the above-mentioned document, information of a number of items requiring frequent upgrade is classified into a voice information structure to be inputted/outputted to a telephone by the voice web operating server, a consumer and an advertiser can be connected on the line to prevent any crimes owing to a telephone number leak, and thus convenience can be optimized.

Another example is a technology about a program design and method for providing a service after voice recognition of massive vocabularies, which is disclosed in Korean Patent Application Publication No. 2006-0037228 (WO2004/023455), entitled "METHOD, SYSTEM AND PROGRAM FOR VOICE RECOGNITION," published on May 3, 2006.

However, the conventional service technologies including those disclosed in the above-mentioned documents merely provide a system-initiative scenario in which a user follows a predetermined scenario or a mutual-initiative scenario which diverges according to user replies, thereby failing to provide services that can satisfy various desires of the user.

In addition, the technology disclosed in the Korean Patent Application Publication No. 2006-0037228 relates to merely a method for constructing a recognition algorithm of a voice recognition engine, in which the user cannot freely adjust or create the scenario unlike the technique proposed by the invention. Furthermore, in the conventional voice service technologies including those disclosed in the above-mentioned patent documents, the system-initiative scenario in which a user follows a predetermined scenario or the mutual-initiative scenario diverging according to user replies is merely provided, which fails to afford services that can satisfy various desires of the user.

Moreover, the technology disclosed in the Korean Patent Application Publication No. 2006-0037228 merely provides a method of constructing a recognition algorithm of a voice recognition engine, and there is a problem in that the user cannon freely adjust the scenario unlike the technology proposed by the invention.

SUMMARY OF THE INVENTION

The invention has been made to overcome the foregoing problems and therefore an object of the invention is to provide a user-initiative voice service system and method capable of effectively supporting voice-based resource search and voice service in places where resource search and service can hardly be provided.

Another object of the invention is to provide a user-initiative voice service system and method capable of user-initiative scenarios that are hardly realizable by system- or mutual-initiative technology.

Yet another object of the invention is to provide a user-initiative voice service system and method capable of user-initiative scenarios by using a data structure composed of voice anchors and voice nodes.

Yet another object of the invention is to provide a user-initiative voice service system and method capable of automatically collecting a grammar that is expected to be spoken by a user.

According to an aspect of the invention for realizing any of the above objects, the invention provides a voice service system which includes a database storing information and is connected with a plurality of terminals by a communication network, including: a call connection unit for transmitting-receiving a signal on a voice service to/from each of the terminals; a voice processing unit for interpreting a voice instruction received from the terminal and converting an internally-created voice service document into a voice message; a recognition management unit for extracting a grammar, which is expected to be spoken by a user, from the database; a document management unit for creating the voice service document including the extracted grammar as a voice anchor; and a control unit for controlling information related to the voice anchor matching with the voice instruction to be provided.

In the voice service system, the database stores data composed of a number of voice anchors, which are keywords of the information to be provided to the user, and a number of voice nodes, which are information to be provided to the user in relation with the voice anchors.

In the voice service system, each of the voice nodes includes a number of the voice anchors, and each of the voice anchors is associated with another one of the voice nodes.

Also in the voice service system, the grammar management unit divides a text of voice nodes, which are stored in the database and supposed to foe provided to the terminal, according to word phrases; removes prefixes, suffixes and special characters from the text of voice nodes to edit a word list; and extracts a word, which matches with the voice anchor stored in the database, as the grammar.

Also in the voice service system, the control unit counts the number of the voice anchors used and stores a resultant counter in the database.

Furthermore in the voice service system, the voice service document comprises a VXML document.

According to another aspect of the invention for realizing any of the above objects, the invention provides a voice service method in a voice service system, which includes a database storing data and is connected with a plurality of terminals by a communication network, in which the data includes a number of voice anchors as keywords of information to be provided to a user and a number of voice nodes as information to be provided to the user in relation with the voice anchors, the method including; receiving a connection request from the terminal; transmitting a service guide voice message in response to the connection request to the terminal; judging whether or not a voice instruction is received from the terminal; if the voice instruction is received, interpreting the voice instruction to judge whether or not any of the voice anchors matches with the voice instruction; and if a matching voice anchor exists, transmitting information related with the voice anchor, converted into an information voice message, to the terminal.

In the voice service method, each of the voice nodes includes a number of voice anchors, and each of the voice anchors is associated with another one of the voice nodes.

Also in the voice service method, the step of transmitting the information related with the voice anchor comprises: searching the voice node in association with the voice anchor from the database; extracting a grammar, which is expected to be spoken by a user, from the searched voice node; converting the voice node into a voice service document including the extracted grammar as the voice anchor; and converting the created voice service document into the information voice message.

Also in the voice service method, the extracting step comprises: dividing a text of the voice node according to word phrases; removing prefixes, suffixes and special, characters from the divided text; editing words of the text into a word list; matching each of the words of the edited word list with the voice anchors stored in the database; and extracting a word matching with the voice anchor as the grammar.

The voice service method may further include: counting the number of voice anchors used and storing a resultant counter in the database.

Furthermore, in the voice service method, the voice service document comprises a VXML document.

BRIEF DESCRIPTION OF THE DRAWINGS

The above and other objects, features and advantages of the present invention will be more apparent from the following detailed description taken in conjunction with the accompanying drawings, in which:

FIG. 6 is a diagram illustrating a table structure of a database according to an exemplary embodiment of the invention;

DETAILED DESCRIPTION OF THE PREFERRED EMBODIMENTS

Figure 1:
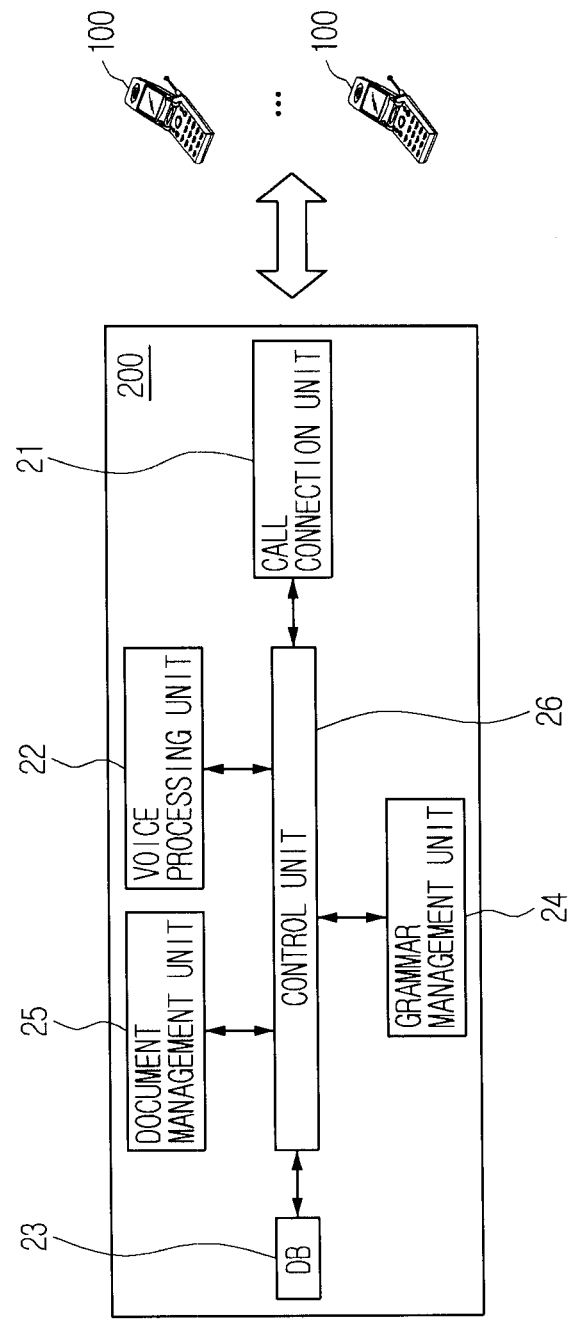
FIG. 1 is a block diagram illustrating an exemplary embodiment or a user-initiative voice service system according to the invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Prior to the detailed description of the invention, the user-initiative scenario proposed by the invention will be described. The term "user-initiative scenario" means a service scenario which can be freely adjusted or created according to user selection. Thus, the user-initiative scenario has a beginning where the user wants to begin and a termination where the user wants to end so that the user can search information and be provided with services while creating the scenario freely. For this purpose, keywords which are expected to be spoken by the user are previously and automatically registered as voice anchors so that, in response to the user speaking a keyword of desired information, the information corresponding to the keyword is provided to the user. In this user-initiative scenario, the amount of information that the user can acquire is determined by the number of voice anchors, and the correctness of information that the user can be provided with is determined by recognition reliability. Here, the term "voice anchor" means a keyword of information to be provided and candidates of the voice anchors are referred to as "grammars."

The voice anchor has been named in the study on the Listener-Controlled Dynamic Navigation of Voice XML (VXML) Documents (University of Texas at Dallas, LNCS 3118, pp. 347-354, 2004) which are used in the establishment of a voice Internet service. In this study, researchers have proposed a proxy server that they developed for navigating in a restrictive VXML page. They also have proposed a technology that can overcome the drawback of VXML with unadjustable grammars by using the CGI so that the VXML application can be terminated when a user wants, any unwanted contents can be skipped, and only desired contents can be acquired. While the invention proposes to control the grammar by using the CGI, the invention also presents in detail a service system and method which adopts a concept of voice anchor and voice node over the concept of the above study in which any unwanted contents can be skipped and a program can be stopped. That is, contents to be provided to the user are previously analyzed and grammars are selectively used as voice anchors. Furthermore, the invention proposes a user-initiative voice service system in which new information of a second node in association with a voice anchor presented to the user is provided again to the user, and such information to be provided is analyzed again, thereby automatically setting and registering the voice anchor and connecting it to the second voice node.

A user-initiative voice service system according to the invention will now be described with reference to FIGS. 1 and 2.

FIG. 1 is a block diagram illustrating an exemplary embodiment of the user-initiative voice service system according to the invention.

As shown in FIG. 1, the user-initiative voice service system 200 of the invention is linked with a plurality of terminals 100 via a network to provide a voice service to the terminals. The user-initiative voice service system 200 includes a call connection unit 21 for transmitting-receiving signals for the voice service to/from the terminals 100; a voice processing unit 22 for interpreting a voice instruction received from the terminals 100 and converting an internally-created voice service document into voices; a database 23 storing data composed of a number of voice anchors, which are essential languages to be provided to a user, and a number of voice nodes, which are information to be provided in association with the voice anchors; a grammar management unit 24 for extracting a grammar, which is expected to be spoken by the user, from the database 23; a document management unit 25 for creating the voice service document, which includes the extracted grammar as a voice anchor; and a control unit 26 for controlling the call connection unit 21, the voice processing unit 22, the database 23, the grammar management unit 24, the document management unit 25 and the internal structure of the voice service system 200 so that the voice nodes, i.e., information related with the voice anchors matching with the voice instruction, can be supportably provided.

The call connection unit 21 shown in FIG. 1 acts to receive a call or voice message from any of the terminals 100 capable of using a telephone service like a wire or mobile telephone and to transmit an internally-created voice message to the terminal 100. Upon, receiving a call connection request or an incoming call from the terminal 100, the call connection unit 21 recognizes the call connection request and provides a call connection to the terminal 100. Upon being connected with the terminal 100, the voice service system 200 receives a voice message from the terminal 100. The voice message is received through the call connection unit 21 arid processed by the voice processing unit 22. The voice processing unit 22 converts the received voice message into a data format usable inside the system in order to interpret what the voice message requests. The voice processing unit 22 also converts a voice service document, composed for a voice service to the user, into voices and sends the voices to the call connection unit 21. The voice service document is made by composing those voices, which the voice service system 200 will transmit to the terminal, into a document form. Examples of the voice service document include Voice eXtensible Markup Language (VXML) and so on. With the voice processing unit 22 performing mutual conversion between voices and documents, it is possible to provide a voice service to the terminals. The mutual conversion between voices and documents is typical in this art and thus will not be described in detail.

The grammar management unit 24 divides a text of a voice node, which is stored in the database 23 and to be provided to the terminal 100, according to every word-phrase; editing a word list using the text with prefixes, suffixes and special characters removed therefrom; and extracts a word matching with a voice anchor stored in the database 23 as a grammar. The extracted grammar is used as the voice anchor and has a function similar to a menu from which the user can make a selection. The menu is a list that an information provider presents in order to receive user requests, in which the user selects a specific offering or item from the menu to request corresponding information from the information provider. In this way, the user can acquire desired information from the information provider. For example, in a case where the user attempts to use a specific service in a web page, he/she makes a selection from a graphic or text menu. Likewise, in order to use the voice service, the user selects a specific item from the voice menu presented by the service provider, by for example dial button input or voice transmission. As described above, the voice anchor is similar to the menu in an aspect that it indicates services to foe provided to the user, and functions to provide related information in response to a word or sentence that the user speaks out.

Figure 2:
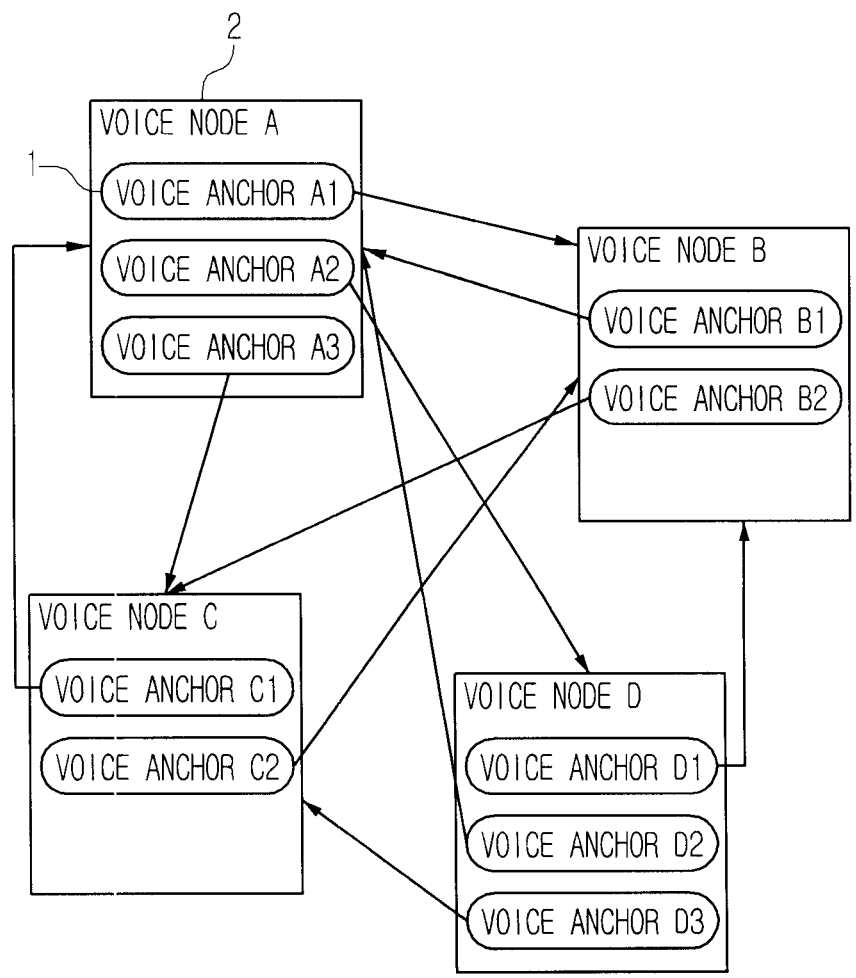
FIG. 2 is a configuration diagram illustrating exemplary voice anchors and voice nodes according to the invention.

FIG. 2 is a configuration diagram illustrating exemplary voice anchors and voice nodes according to the invention.

As shown in FIG. 2, for the realization of user-initiative scenarios according to the invention, data to be served are stored as voice anchors 1 and voice nodes 2 in the database 23. The voice nodes 1 are essential languages to be provided to the user, and the voice nodes 2 are information and contents to be provided to the user in association with the voice anchors 1. Each of the voice nodes 2 includes a plurality of voice anchors 1, and each of the voice anchors 1 is connected to another one of the voice nodes 2 having relevancy. The voice node 2 newly connected has new information different from that of the previous one and includes different ones of the voice anchors 1. Of course, those voice anchors 1 in the new voice node 2 are connected to different voice nodes 2.

Accordingly, if a voice instruction received from the terminal 100 is a voice anchor A1, a voice node B in association with the voice anchor A1 is provided to the terminal 100. Likewise, if a voice instruction received from the terminal 100 is a voice anchor D3, a voice node C in association with the voice anchor D3 is provided to the terminal 100. This is based on a principle that one voice anchor 1 included in one voice node 2 can also be included in another voice node 2. For example, suppose that a voice node 2 of "new technology trend" includes voice anchors 1 such as 'computer,' 'mobile,' 'semiconductor' and etc., in a case where the voice node 2 of "new technology trend" is provided to the user. If the user, upon being provided with the voice node 2 of 'new technology, selects one voice anchor 1 of 'mobile' in order to acquire more detailed, information, the voice service system 200 provides another voice node 2 of "mobile trend" associated with the voice anchor 1 of 'mobile' to the user again.

Furthermore, the control unit 26 counts the number of times that the voice anchors 1 are used, which is stored in the database 23 arid used as statistics to analyze proceeding patterns of the scenarios and the like.

The user-initiative voice service method of the invention will now be described with reference to FIGS. 3 to 8.

Figure 3:
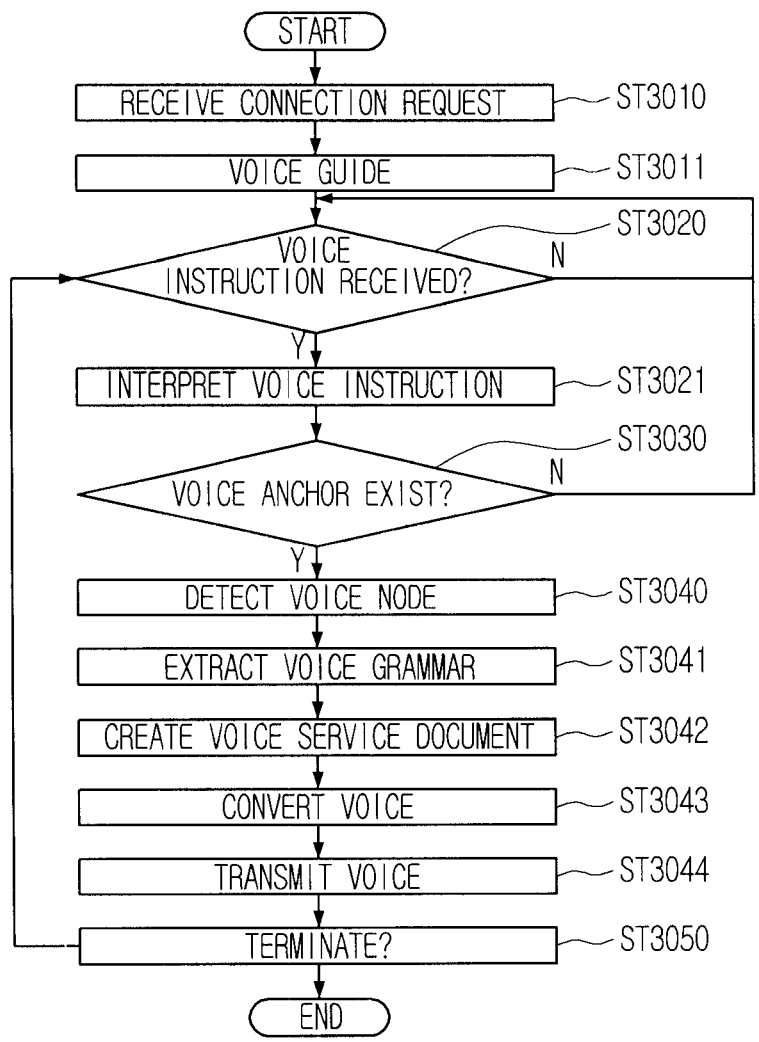
FIG. 3 is a flowchart illustrating an exemplary embodiment of a user-initiative voice service method according to the invention.

FIG. 3 is a flowchart illustrating the user-initiative voice service method according to an embodiment of the invention.

As shown in FIG. 3, first, the call connection unit 21 of the voice service system 200 receives a connection request from the terminal 100 in ST3010. The connection request is a telephone signal received via dialing from the terminal 100. In response to the connection request as received, the voice service system 200 transmits a service guide voice to the terminal 100 in ST3011. The initial guide information is stored in the database 23, as previously generated. In ST3020, the call connection unit 21 judges whether or not a voice instruction is received from the terminal 100 after the transmission of the service guide voice. If the voice instruction is received from the terminal 100 through the call connection unit 21, the call connection unit 21 forwards the received voice instruction to the voice processing unit 22, and the voice processing unit 22 interprets the received voice instruction in ST3021. The voice candidate management unit 24 judges whether or not a voice anchor matching with the interpreted voice instruction exists in the database 23 in ST3030.

If it is judged, in ST3030, that the matching voice anchor exists in the database 23, a voice node of the matching voice anchor is converted into a voice message and transmitted to the terminal 100. This step will be described in detail as follows:

First, the grammar management unit 24 searches the database 23 for any voice node in association with the matching voice anchor in ST3040. If a corresponding voice node is searched, the grammar management unit 24 extracts a grammar, which is expected to be made by the user, from the searched voice node in ST3041. Then, the document management unit 25 converts the voice node, including the grammar as a voice anchor, into a voice service document in ST3042. The voice service document is forwarded to the voice processing unit 22, which converts the voice service document into a voice message in ST3043, and the call connection unit 21 transmits the converted voice message to the terminal in ST3044.

If it is judged that a matching voice anchor does not exist in the database in ST3030, the grammar management unit 24 transmits a voice message requesting re-inputting of a voice instruction to the terminal 100 and stands by in order to determine whether or not the voice instruction is received.

Then, upon receiving a termination request from the terminal in ST3050, the service is terminated. If not, the process returns to step ST3020 to judge whether or not a voice instruction is received and repeats procedures accordingly.

Figure 4:
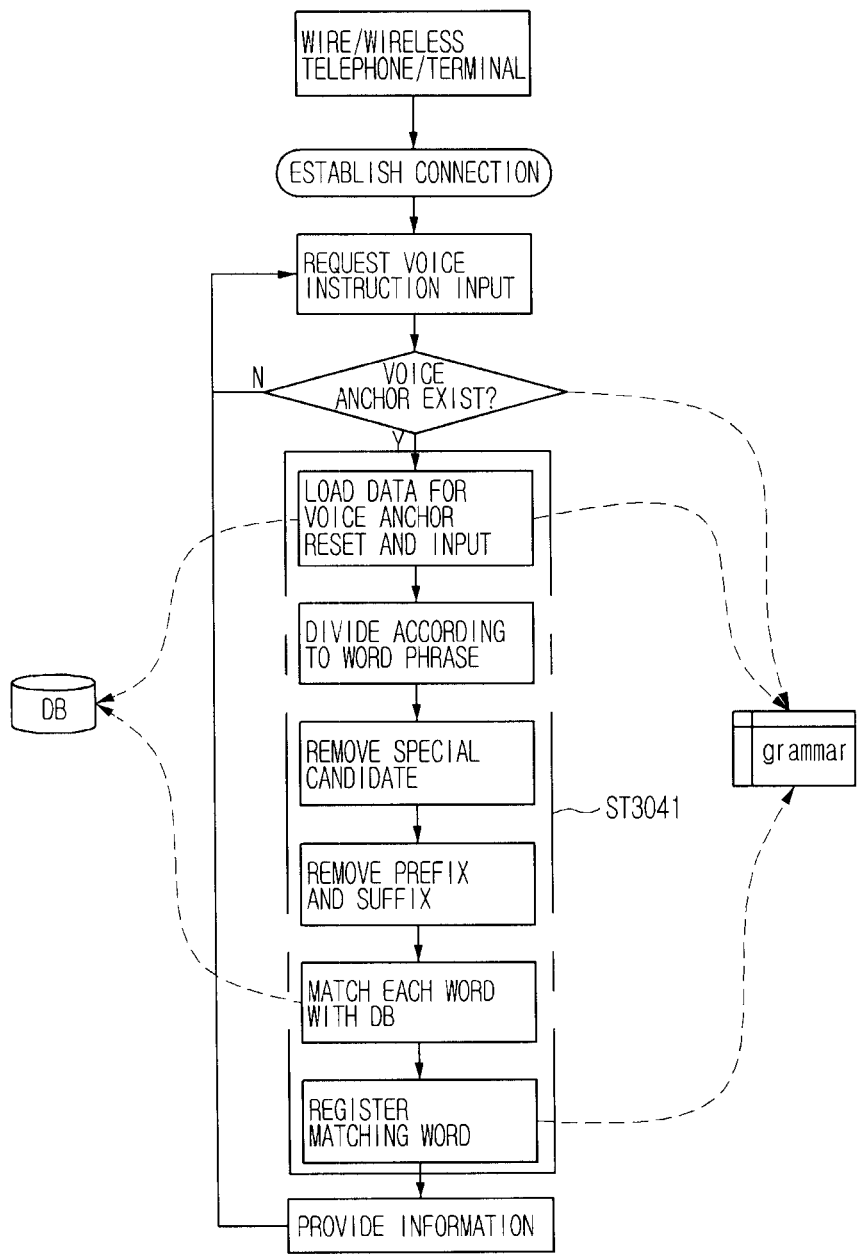
FIG. 4 is a block diagram, illustrating a process of extracting a grammar according to an exemplary embodiment of the invention.

FIG. 4 is a block diagram illustrating a process of extracting a grammar according to an exemplary embodiment of the invention.

In the voice service method of the invention, the voice service system 200 should predict and define a word that the user will speak in order to provide information to the terminal 100. In order to apply a structure of voice anchors and voice nodes, a process of collecting a grammar to be used as a voice anchor is essential. For this purpose, a connection between the terminal 100 and the system 200 is established and a grammar is extracted from a text of information to be provided at the first time. The text of the information to be provided to the terminal is divided according to word phrases and edited into a word list by removal of prefixes, suffixes and special characters therefrom. Then, an effective word is matched with a voice anchor of a pre-established database and the matching word is registered as the grammar. The registered grammar is used as a voice anchor of the information to be provided.

As shown in FIG. 4, with the connection established, the wire/wireless telephone or terminal 100 is requested to input a voice instruction. Upon receiving the voice instruction, the system judges whether the received voice instruction has a voice anchor. That is, when a service guide message, for example "Please select an item of articles to be searched from the following: 1. Economic trend, 2. Political trend and 3. New technology trend" is transmitted, the voice instruction is received from the terminal 100. Here, the voice anchors include 'Economic trend,' 'Political trend' and 'New technology trend,'

If the received voice instruct ion, exists in the voice anchor, the voice system 200 transmits the corresponding information to the terminal 100. Prior to the transmission of the information, the contents of the information to be provided are analyzed to extract a voice candidate, of which it is expected that the user will speak it. Then, the voice candidate is registered as a voice anchor matching with a voice instruction to be received next. Upon receiving one of the registered voice anchors from the terminal 100, the system repeats a process of providing corresponding new information to the terminal 100 and extracting a grammar to register as a voice anchor.

On the other hand, if the received voice instruction does not exist in the voice anchor, a voice request "Please give a voice instruction again" is transmitted again to the terminal 100.

The procedure of ST3041, that is, the step of voice candidate extraction is carried out by specific steps as illustrated in FIG. 4. First, the grammar management unit 24 divides the text of a voice node according to word phrases and removes prefixes, suffixes and special characters therefrom. Then, words divided into substantive forms are edited into a word list, and the respective words in the word list are matched with a plurality of voice anchors stored in the database. A word matching with any of the voice anchors is extracted as a grammar and used as a voice anchor.

Figure 5:
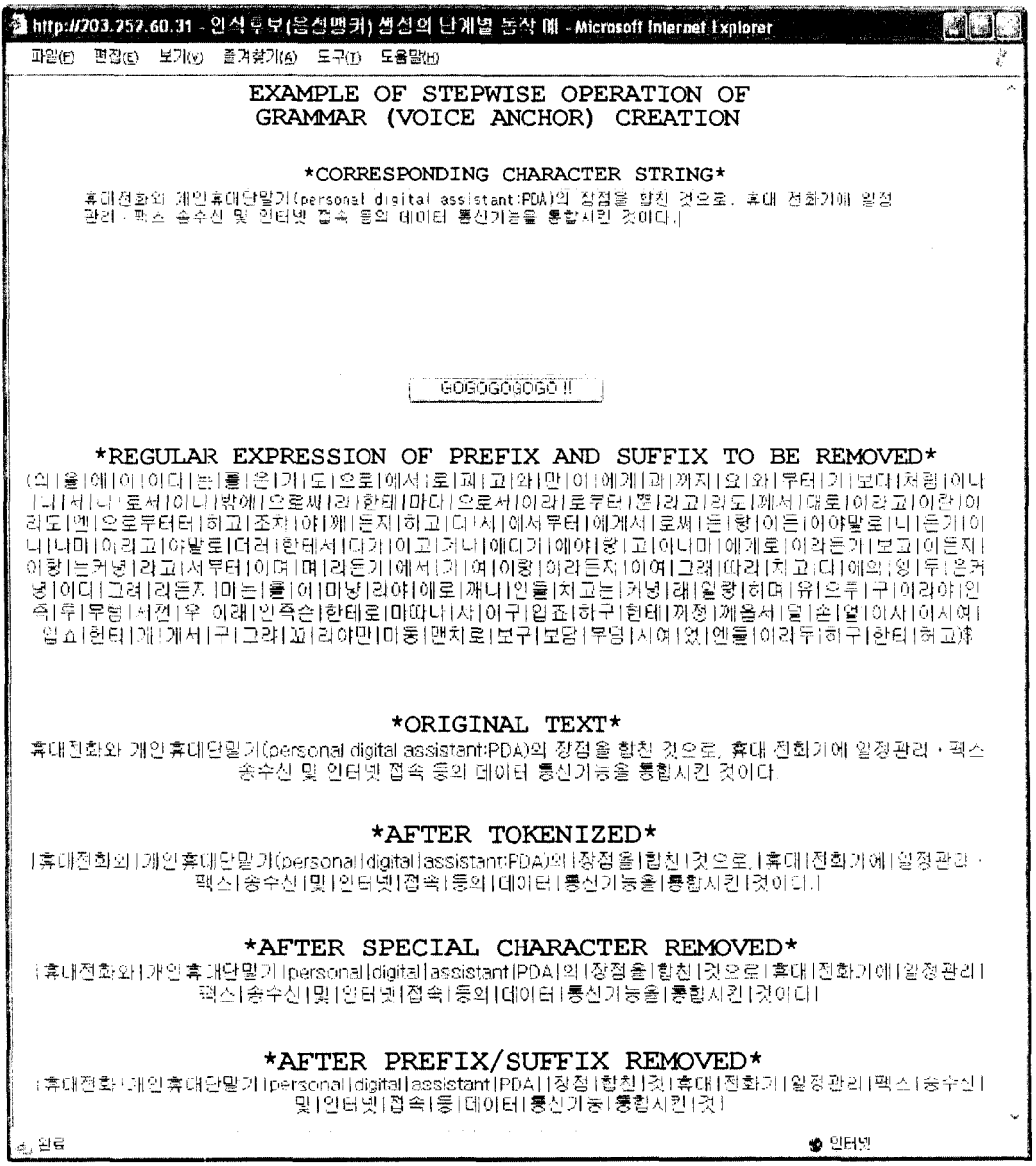
FIG. 5 is a diagram illustrating a screen of a word list creation according to an exemplary embodiment of the invention.

FIG. 5 is a diagram illustrating a screen of a word list creation according to an exemplary embodiment of the invention.

As shown in FIG. 5, it is supposed that a text of voice nodes to be transmitted from the voice service system 200 to the terminal 100 is "This is a combination of merits of a mobile phone and a Personal Digital Assistant (PDA), in which various data communication functions including schedule management, fax transmission/receiving and Internet access are incorporated into the mobile phone."

First, a text is divided according to word phrases in order to produce a word list contained in a voice node that will be provided to the terminal 100. The word list is tokenized on spaces of a sentence to be divided according to word phrases. The original text of the voice node is divided according to word phrases as shown in 'tokenized' item in FIG. 5.

Then, special characters are removed from the divided word phrases. That is, respective characters are compared with the ASCII code values corresponding to special characters and, if judged consistently, replaced with blanks. At the end of the sentence, the blanks are deleted to remove the special characters. This is one of the procedures for extracting words from the word phrases, in which the result is shown, for example, as the 'Special characters removed' item in FIG. 5.

Then, prefixes and suffixes are removed from the word phrases, which have been cleared of the special characters. A method for removing the prefixes and suffixes uses a Regular Expression, i.e., a sort of pattern composed of special symbols (meta characters), which can indicate a series of data. With patterns composed according to the regular expression, word phrase types of the word phrases cleared of the special characters are compared to remove a prefix or suffix from a character structure matching with any of the patterns. To remove the prefixes and suffixes, it is preferred to collect more lists as seen in FIG. 5, "Regular expression of prefixes and suffixes to be removed." The result of the prefix and suffix removal is shown, for example, as 'Prefix/suffix removed' item in FIG. 5.

As stated above, a word list is composed of text words which are divided according to word phrases arid cleared of prefixes, suffixes and special characters.

Figure 7:
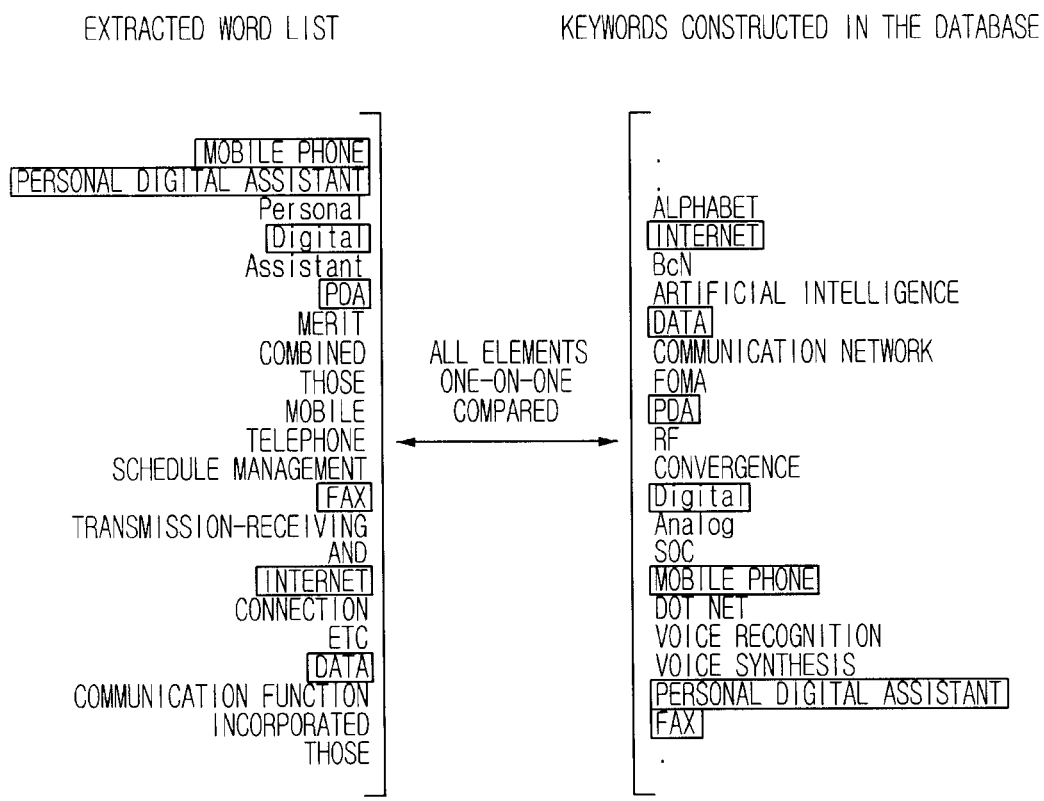
FIG. 7 is a diagram illustrating a voice anchor matching process according to an exemplary embodiment of the invention.

FIG. 6 is a diagram illustrating a table structure of a database according to an exemplary embodiment of the invention, and FIG. 7 is a diagram illustrating a voice anchor matching process according to an exemplary embodiment of the invention.

Word phrases obtained by the removal of special characters, prefixes and suffixes are composed into a word list and matched with voice anchors of the database 23, which have been previously stored by construction or search. That is, the word list cleared of prefixes or suffixes includes a number of words corresponding to nouns. Of the nouns, those elements stored in the database are composed into a voice anchor. The operation of the system 200 of the invention needs the database 23 having data, which have been previously stored by construction or search. Essential elements of the table of the database 23 are identifiers, keywords, information of keywords, numbers of access and other information.

The word list edited by removing special characters, prefixes and suffixes from the word phrases of the original text is matched and compared with keywords of the data constructed in the database, respectively, by the recognition management unit 24 as shown in FIG. 7. Each word of the word list extracted is compared with the voice anchors constructed in the database 23 and, in case of being consistent, registered as a grammar. The grammar is then stored as a voice anchor to be used in the next procedure to provide information.

Figure 8:
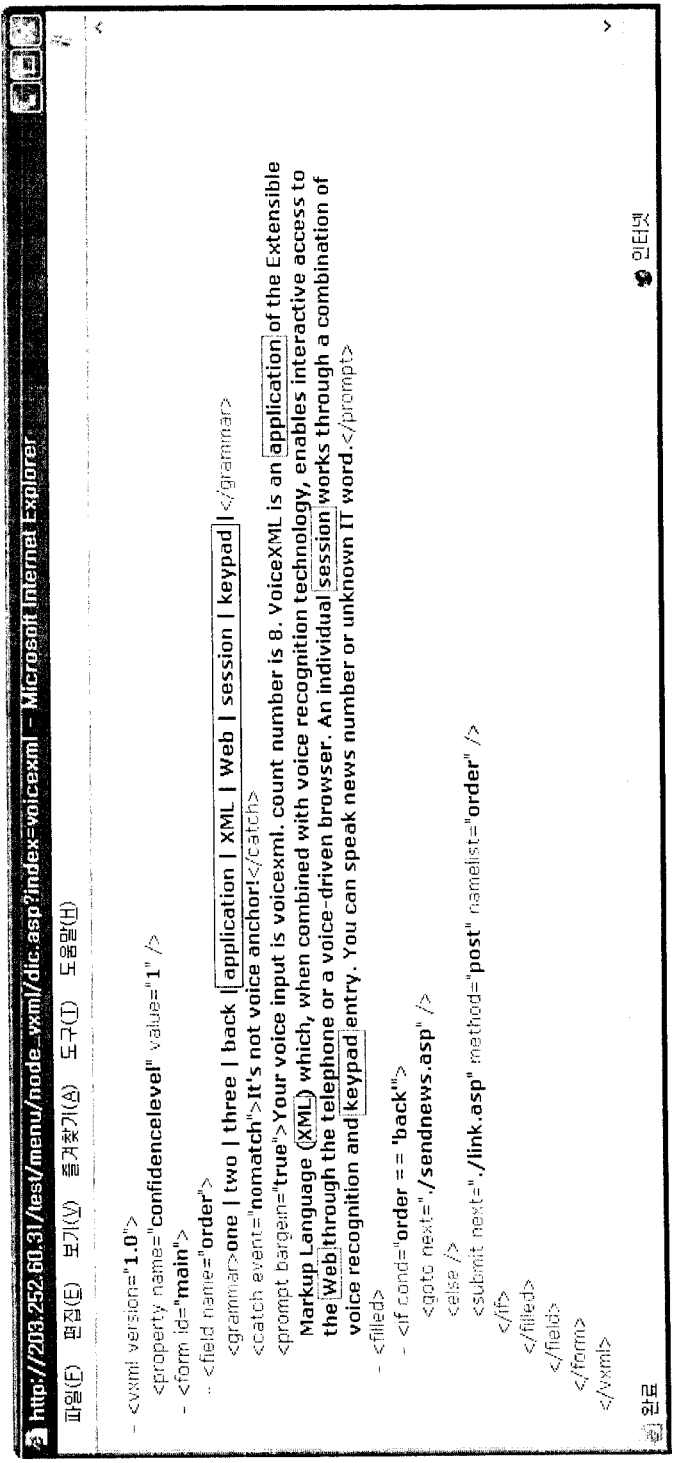
FIG. 8 is a diagram illustrating a voice service document according to an exemplary embodiment of the invention, to which a voice anchor is added.

FIG. 8 is a diagram illustrating a voice service document according to an exemplary embodiment of the invention, to which a voice anchor is added.

A word matching with the voice anchor is extracted as a grammar and used as a voice anchor, as shown in FIG. 8. FIG. 8 is an example display of a news service VXML document using a previously constructed IT terminology dictionary. As shown in FIG. 8, the contents in <grammar> tag become voice anchors. 'one', 'two', 'three' and 'Back' are basically stored anchors, and 'application', 'XML' and 'SESSION' are voice anchors added by a process of grammar extraction. The voice service system 200, upon receiving a voice instruction from the terminal 100 that speaks out a voice anchor, converts a voice node in association with a voice anchor of the database 23 into a voice message and transmits the voice message to the terminal 100.

The numbers of times the voice anchors adopted in the invention are used is also counted and their counters are stored and managed in the database 23. That is, the voice anchors are selected through voice instructions received from the terminal 100, and accordingly, voice nodes in association with the voice anchors are provided to the terminal 100. Here, the counter is increased by one at every access to the voice anchor and registered and updated as corresponding access counter data in the database 23. This function is an additional element in the system design and the service method, and can be used to compose statistical resources indicating what information users request and what scenario users proceed with arid to determine future service policies.

Considering that the most effective communication method between the system and she human of the ubiquitous technology such as voice recognition and synthesis will be used in common in the near future, a large marketability potential is expected. Accordingly, the invention can be applied to voice search engines, voice portals, voice dictionaries, mobile phones, electronic diaries and other voice service fields. The invention can also be used by web agents, voice recognition/synthesis application manufacturers, voice solution expert groups and so on.

As described above, according to the user-initiative voice service system and method of the invention, the user-initiative scenario is not restrictive and thus can provide an effect in that the user can search resources and acquire information via voice by using a wire/wireless terminal in a similar manner that Internet resources are searched with eyes on a web browser.

According to the user-initiative voice service system and method of the invention, it is possible to provide various services which are rarely realizable by the system- or mutual-initiative scenario.

Furthermore, according to the user-initiative voice service system and method of the invention, it is possible to automatically collect and provide a grammar, which is expected to be spoken by the user, thereby ensuring liberty to the occurrence of scenarios.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed:

1. A voice service system comprising:
    a database storing a plurality of voice nodes and a plurality of voice anchors, wherein each of the plurality of voice nodes includes information to be provided to a user, each of the plurality of voice anchors are keywords of the information to be provided to the user, and each voice node includes at least one voice anchor associated with another voice node;
    a call connection unit to receive a voice instruction from a terminal and to transmit a voice message to the terminal in response to the voice instruction, wherein the voice message includes one or more of the plurality of voice anchors;
    a voice processing unit to convert the voice instruction received from the terminal into a data format and to convert an internally-created voice service document into the voice message;
    a grammar management unit to determine that the converted voice instruction includes data matching one of the plurality of voice anchors and an associated voice node, the grammar management unit further to extract a grammar from the associated voice node, wherein the grammar is registered as matching one of the plurality of voice anchors and expected to be spoken by a user in response to the associated voice node, wherein extracting a grammar from the associated voice node includes
        dividing text of the associated voice node according to word phrases,
        removing prefixes, suffixes, and special characters from the divided text of the associated voice node to create a word list, and
        extracting a word from the word list that matches with one of the plurality of voice anchors stored in the database;
    a document management unit for creating the voice service document from the associated voice node ; and
    a control unit for controlling information related to the registered voice anchor.

2. The voice service system according to claim 1, wherein the control unit counts the number of voice anchors used and stores a resultant counter in the database.

3. The voice service system according to claim 1, wherein the voice service document comprises a voice extensible markup language document.

4. A voice service method in a voice service system, which includes a database storing data and is connected with a terminal by a communications network, in which the data includes a plurality of voice nodes and a plurality of voice anchors, wherein each of the plurality of voice nodes includes information to be provided to a user, each of the plurality of voice anchors are keywords of the information to be provided to the user, and each voice node includes at least one voice anchor associated with another voice node, the method comprising:
    receiving a connection request from the terminal;
    transmitting a service guide voice message in response to the connection request to the terminal, the service guide voice message including a voice anchor associated with another voice node;
    receiving a voice instruction from the terminal;
    determining that the voice instruction includes data matching the voice anchor included in the service guide voice message; and
    transmitting, in response to the voice instruction, an information voice message including one or more of the plurality of voice anchors to the terminal, wherein transmitting the information voice message includes
        extracting a grammar from the voice node associated with the anchor included in the service guide voice message, the grammar being registered as matching one of the plurality of voice anchors and expected to be spoken by a user in response to the associated voice node, wherein the extracting includes
            dividing a text of the associated voice node according to word phrases,
            removing prefixes, suffixes, and special characters from the divided text,
            creating a word list from the divided text, and
            extracting a word from the word list that matches one of the plurality of voice anchors as the grammar,
        converting the associated voice node into a voice service document, and
        converting the created voice service document into the information voice message.

5. The voice service method according to claim 4, further comprising: counting the number of voice anchors used and storing a resultant counter in the database.

6. The voice service method according to claim 4, wherein the voice service document comprises a voice extensible markup language document.

* * * * *